United States Patent
Braham et al.

(10) Patent No.: US 10,169,139 B2
(45) Date of Patent: Jan. 1, 2019

(54) USING PREDICTIVE ANALYTICS OF NATURAL DISASTER TO COST AND PROACTIVELY INVOKE HIGH-AVAILABILITY PREPAREDNESS FUNCTIONS IN A COMPUTING ENVIRONMENT

(71) Applicant: International Business Machines Corporation, Armonk, NY (US)

(72) Inventors: Adam D. Braham, Rochester, MN (US); David W. Granum, Rochester, MN (US); Benjamin W. Rabe, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 177 days.

(21) Appl. No.: 15/266,537

(22) Filed: Sep. 15, 2016

(65) Prior Publication Data
US 2018/0074887 A1    Mar. 15, 2018

(51) Int. Cl.
*G06F 11/00* (2006.01)
*G06F 11/07* (2006.01)

(52) U.S. Cl.
CPC ........ *G06F 11/0793* (2013.01); *G06F 11/079* (2013.01); *G06F 11/0709* (2013.01); *G06F 11/0754* (2013.01)

(58) Field of Classification Search
CPC ............. G06F 11/0793; G06F 11/0709; G06F 11/0754; G06F 11/079
See application file for complete search history.

(56) References Cited

U.S. PATENT DOCUMENTS

| 7,602,285 B2 | 10/2009 | Sznaider et al. |
| 7,650,529 B2 | 1/2010 | Fan et al. |
| 7,734,245 B2 | 6/2010 | Ravela et al. |
| 7,958,393 B2 * | 6/2011 | Bobak ................. G06F 11/0793 714/15 |
| 8,694,822 B2 * | 4/2014 | Radhakrishnan ... G06F 11/0709 714/4.1 |
| 9,417,939 B2 * | 8/2016 | Thiel ................... G06F 11/0709 |
| 2007/0033153 A1 | 2/2007 | Yamanaka et al. |
| 2008/0189154 A1 * | 8/2008 | Wainwright ........... G06Q 10/06 705/7.28 |

(Continued)

OTHER PUBLICATIONS

CAFC, *Electric Power Group, LLC v. Alstom S.A.*, pp. 1-12 (Year: 2016).*

(Continued)

*Primary Examiner* — Marc Duncan
*Assistant Examiner* — Jonathan D Gibson
(74) *Attorney, Agent, or Firm* — Marcia L. Doubet

(57) ABSTRACT

Using predictive analytics of natural disaster in a proactive manner to proactively invoke appropriate action(s) to prepare for an impending disaster, in view of a cost of such action(s), to maintain high availability of a computing environment and/or to facilitate disaster recovery therein. Existing natural disaster prediction model(s) are leveraged to provide input to an assessment of cost/benefit, such that proactive measures can be selected for automatic invocation within the computing environment.

15 Claims, 5 Drawing Sheets

*100*

| | 110 Proactive Measure | 120 Business Impact of Performing Measure | 130 Weighted business cost | 140 Executable |
|---|---|---|---|---|
| 150 | Perform unscheduled storage level backup | 20% increase in I/O response times | 15 | Command A |
| 160 | Allocate additional network bandwidth to replication pipeline | Increase likelihood of web page timeout by 25% | 25 | Script B |
| 170 | License and Activate additional processors on HA box | Licensing cost of $40,000 | 40 | Script C |
| 180 | Begin migration of production to HA box | Temporary loss of access to some applications | 55 | Script D |

(56) References Cited

U.S. PATENT DOCUMENTS

| | | | |
|---|---|---|---|
| 2013/0185667 A1* | 7/2013 | Harper | G06F 11/0709 |
| | | | 715/772 |
| 2013/0204983 A1* | 8/2013 | Kenkre | G06F 9/50 |
| | | | 709/220 |
| 2013/0339204 A1* | 12/2013 | Dias De Assuncao | |
| | | | H04L 67/1097 |
| | | | 705/35 |
| 2013/0346786 A1* | 12/2013 | Thiel | G06F 11/0709 |
| | | | 714/2 |
| 2014/0215255 A1* | 7/2014 | Zaheer | G06F 11/004 |
| | | | 714/1 |
| 2014/0280382 A1* | 9/2014 | Gabay | G06Q 10/087 |
| | | | 707/812 |
| 2015/0242289 A1 | 8/2015 | Suzuki et al. | |
| 2015/0370619 A1* | 12/2015 | Nagura | G06F 9/542 |
| | | | 719/318 |
| 2016/0292028 A1* | 10/2016 | Gamage | G06F 11/079 |
| 2016/0342459 A1* | 11/2016 | Thiel | G06F 11/0709 |

OTHER PUBLICATIONS

Yehuda Kossowsky, "IBM Insights for Weather available in Bluemix", Web-published article of International Business Machines Corporation, printed from https://developer.ibm.com/bluemix/2015/10/23/ibm-insights-weather-available-in-bluemix/ on Aug. 27, 2016. 5 pages.

* cited by examiner

| Proactive Measure | Business Impact of Performing Measure | Weighted business cost | Executable |
|---|---|---|---|
| Perform unscheduled storage level backup | 20% increase in I/O response times | 15 | Command A |
| Allocate additional network bandwidth to replication pipeline | Increase likelihood of web page timeout by 25% | 25 | Script B |
| License and Activate additional processors on HA box | Licensing cost of $40,000 | 40 | Script C |
| Begin migration of production to HA box | Temporary loss of access to some applications | 55 | Script D |

| Likelihood of outage | Business Cost merited by likelihood |
|---|---|
| 20% | <= 10 |
| 60% | <= 35 |
| 90% | <= 100 |

| Proactive Measure | Executable | Weighted Business Cost |
|---|---|---|
| Perform Flash Copy of Production system storage | /home/scripts/flash.script | 15 |
| Allocate additional network bandwidth to replication link | /home/scripts/qos_replication.script | 25 |
| License and activate additional CPU on the HA/DR system | /home/scripts/allocate_DR_CPU.script | 40 |
| Initiate migration of Production system to HA/DR system | /home/scripts/switchover.script | 55 |

| Current Likelihood of Outage Event | Cost Threshold |
|---|---|
| 10% | <=20 |
| 25% | <=40 |
| 50% | <=60 |
| 80% | 100 |

410 / 420
430 / 440 / 450 / 460

USING PREDICTIVE ANALYTICS OF NATURAL DISASTER TO COST AND PROACTIVELY INVOKE HIGH-AVAILABILITY PREPAREDNESS FUNCTIONS IN A COMPUTING ENVIRONMENT

BACKGROUND OF THE INVENTION

The present invention relates to proactive natural disaster preparedness, and more particularly to using predictive analytics of natural disaster in a proactive manner to determine the cost of actions, and proactively invoke appropriate actions, to maintain high availability of a computing environment in view of an impending natural disaster.

Natural disaster prediction models, including those limited to weather-related disasters, are known and are in wide use. Such models are used, for example, to predict hurricanes, floods, earthquakes, tsunamis, and other natural disasters or emergency situations. Techniques for disseminating notifications from such prediction models are also known, and subscribers of the notifications may range from sophisticated commercial or government users who receive such information in a data center to amateurs who may wish to receive such information on their cell phone, depending on the type of notification service.

BRIEF SUMMARY OF THE INVENTION

The present invention is directed to proactive natural disaster preparedness. In one embodiment, this comprises: receiving a notification of an impending natural disaster; determining a threshold corresponding to a likelihood of the predicted disaster; determining, for the threshold, at least one proactive measure corresponding thereto for enabling a computing environment to maintain high availability; and automatically invoking each of the at least one determined proactive measure. The natural disaster may be, for example, a weather-based disaster such as a hurricane or flood.

Embodiments of these and other aspects of the present invention may be provided as methods, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

BRIEF DESCRIPTION OF THE SEVERAL VIEWS OF THE DRAWINGS

FIG. 1 illustrates a sample data structure created to specify information about proactive measures that may need to be taken to maintain high availability in view of an impending natural disaster, and FIG. 3 illustrates an alternative form of this data structure;

FIG. 2 illustrates a sample data structure created to specify a tiered, cost-based approach to invoking the proactive measures specified in the data structure of FIG. 1, and FIG. 4 illustrates an alternative version of this data structure with reference to the example data structure in FIG. 3;

DETAILED DESCRIPTION OF THE INVENTION

Figure 5:
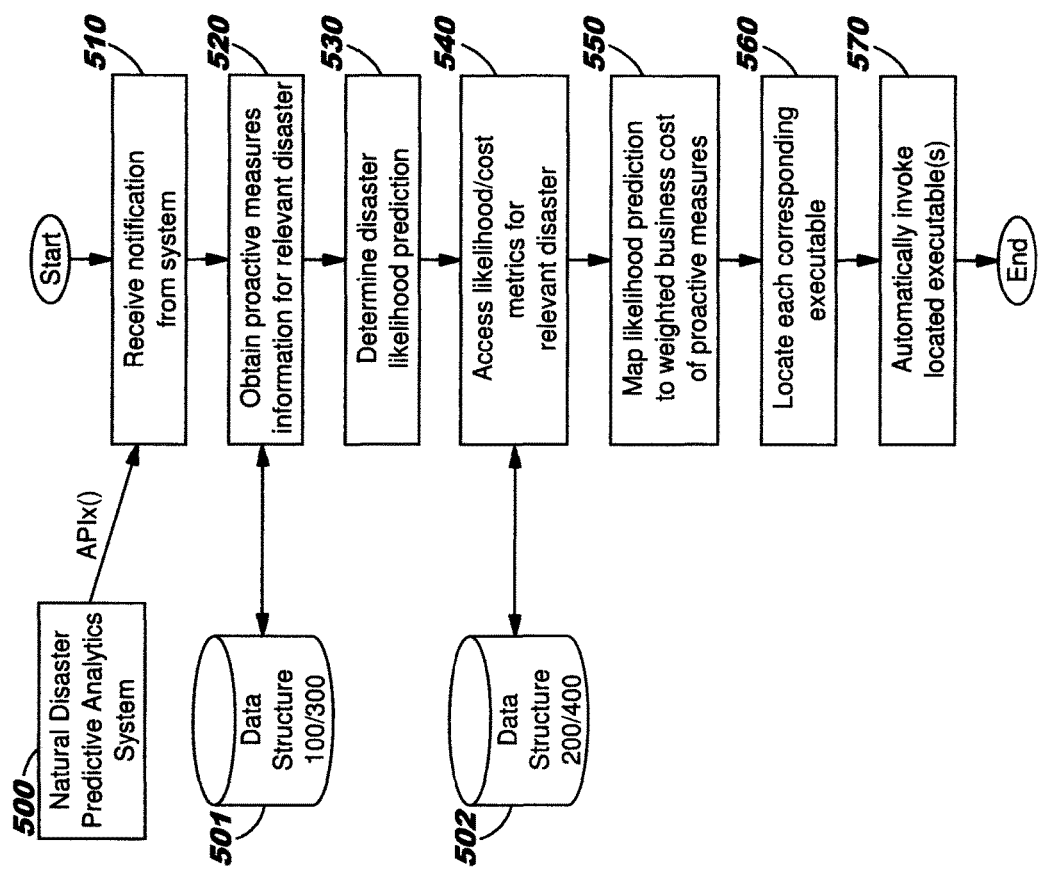
FIG. 5 provides a flowchart illustrating an approach to operation of an embodiment of the present invention.

Embodiments of the present invention are directed toward using predictive analytics of natural disaster in a proactive manner to proactively invoke appropriate action(s) to prepare for an impending natural disaster, in view of a cost of such action(s), to maintain high availability of a computing environment and/or to facilitate disaster recovery therein. Existing natural disaster prediction model(s) are leveraged to provide input to an assessment of cost/benefit, such that proactive measures can be selected for automatic invocation within the computing environment. The computing environment may include a High Availability ("HA") management system in which this processing occurs. A costing algorithm preferably performs the cost/benefit assessment, and an output thereof is used to evaluate what preparation activities, if any, should be invoked in view of the predicted likelihood of a natural disaster and the business cost of an invoked activity. As the likelihood of a disaster-related outage increases, high-availability preparation related activities that would not normally be worth the business cost are considered and executed if the risk of not doing them is calculated to outweigh the business impact of performing the activities. (The high-availability preparation related activities are referred to equivalently herein as proactive measures.)

As noted earlier, existing models are available that predict hurricanes, floods, earthquakes, tsunamis, and other natural disasters or emergency situations, and notification systems exist for disseminating notifications from such prediction models. Advanced warning allows those receiving the notifications to manually start to prepare for the natural disaster, which may include performing high availability preparedness functions.

An example of a high availability function for a data center of a computing environment is to migrate computing power from one physical location to another. So, for example, if a group of servers in the eastern United States is handling responses to inquiries from a merchant's web page, and a hurricane is predicted to impact that geographic region, outage of the merchant's web page can likely be avoided by migration of the responsibility to handle the web page inquiries to a data center on the west coast of the United States. Another example where providing high availability is important is to have ready access to an institution's data records, and preparation activities may therefore include ensuring that an up-to-date backup of those records exists. As is readily understood, large institutions commonly perform such backup during periods of otherwise low activity, so as not to impact normal computing environment operations. In this example, taking proactive action in view of an impending natural disaster may comprise performing this backup at an unscheduled time, even though it will impact the normal operations.

In view of these examples, it will be recognized that many different types of institutions are impacted by natural disasters, and the actions they need to take—or consider taking—to maintain high availability of their computing environment will vary widely. For ease of reference but not of limitation, institutions or environments where an embodiment of the present invention may be advantageously used will be referred to hereinafter as "HA environments". It should be noted that HA environments where an embodiment of the present invention may be advantageously used are not limited to those that perform "computing" or computations, and include other institutions such as manufacturing environments that operate using automated controllers.

While existing preparedness systems notify users and allow them to begin preparations manually, techniques are lacking in the prior art that enable HA environments to respond to natural disaster notifications by automatically taking appropriate action. A great deal of time savings and financial savings could be realized in HA environments if manual action invocation was not required. These time and financial savings include not only the cost of requiring human intervention when using a manual approach, but may also include added expense that is incurred when systems begin to fail or degrade due to delay on the part of the human being(s). Accordingly, embodiments of the present invention leverage predictive analytics of natural disaster to automatically (e.g., without intervention of a human being) take proactive measures. Examples of such proactive measures include shifting workload and performing unscheduled backups (as in the examples discussed above), as well as reallocating resources, dynamically requesting licenses on a machine that will take over workload and/or de-licensing from a machine that will have its workload migrated elsewhere, and so forth.

An embodiment of the present invention preferably uses data structures of the form illustrated in FIGS. 1-4 as input to a costing algorithm, where these data structures specify various proactive measures information and likelihood/cost information (as will be discussed herein). FIGS. 1 and 2 provide a first set of sample data for use with this costing algorithm, and FIGS. 3 and 4 provide a second set of sample data, as will now be described.

The sample data structure 100 in FIG. 1 (shown as a table, by way of illustration but not of limitation) may be created for an HA environment to specify what types of proactive measures may need to be taken, the business impact of each measure, and a weighted business cost of taking that measure. In addition, a stored command or script (or other identifier of automated functionality) is preferably specified for each proactive measure. See columns 110, 120, 130, 140, respectively, which will now be described.

Column 110 identifies at least one proactive measure that may be taken in view of an impending natural disaster. As will be understood in view of the teachings herein, the proactive measures 110 that may be taken will depend on the operations occurring at the particular HA environment, and accordingly, the measures to be included in each row for column 110 will typically be determined by those who have responsibility for HA activities. Examples shown in FIG. 1 include performing unscheduled backup of storage (which was discussed above), allocating additional network bandwidth to a replication pipeline (such that replication can complete more quickly), licensing and activating additional processors on an HA machine (such that work can be transferred to that machine), and beginning migration of production from one machine to another machine for HA.

Column 120 specifies the business impact of performing each proactive measure. This business impact will typically be determined by those who have responsibility for HA activities, perhaps in consultation with others such as business analysts and/or cost analysts. These values may be estimated values or actual values. In the examples shown in FIG. 1, the business impact of the unscheduled backup (row 150) is specified as a 20 percent increase in I/O (input/output) response time; the business impact of allocating additional network bandwidth (row 160) is specified as increasing the likelihood of a timeout on a web page by 25 percent; the business impact of licensing and activating an additional processor (row 170) is specified as having a licensing cost of $40,000; and the business impact of beginning migration of production (row 180) is specified as causing a temporary loss of access to some applications.

A weighted business cost is determined for each proactive measure, and this weighted business cost is entered in the rows for column 130. Again, these weighted business cost values will typically be determined by those who have responsibility for HA activities, perhaps in consultation with others such as business analysts and/or cost analysts, and such values may be estimated values or actual values. In the example, the weighted business costs have been specified as 15 units, 25 units, 40 units, and 55 units, respectively. As an example, it can be seen that this particular institution expects to incur a much lower business cost by performing an unscheduled backup (row 150) as compared to migrating production (row 180). Note that the units in which the weighted business cost 130 is specified may vary from one HA environment to another. The units may be financial metrics, for example, such as a relative revenue loss or an actual dollar amount. As alternatives, the units may represent an amount of time, a number of users who are unable to perform their job if the measure is invoked, and so forth. As another alternative, the units may be chosen to reflect relative importance of the various proactive measures.

The weighted business cost 130 of a particular proactive measure 110 may vary from one HA environment to another. Suppose, for example, that the HA environment for which the sample values in FIG. 1 were created provides a web page from which users can retrieve published documents. A 20 percent increase in I/O response time in this document retrieval environment is much less significant for users than if the HA environment is supporting real-time stock trades, for example. In the stock trading environment, the increased response time may be nearly intolerable for the users, and thus the weighted business cost for this environment would be expected to be specified as a much higher value (as compared to the 15 units in row 150).

Column 140 specifies, for each proactive measure having a row in data structure 100, an executable command or script, or other identifier of executable functionality, to be invoked in an automated manner. The syntax for specifying commands, scripts, and identifiers will be readily understood to one of ordinary skill in the art, and accordingly, a detailed description thereof is not deemed necessary to an understanding of the present invention. "Command A" from row 150, for example, might comprise the format of a command that will back up a specified database to a specified target location. "Script B" from row 160, as another example, might comprise syntax for executable code that, when executed, causes the desired increase in network bandwidth allocation. Each entry in column 140 may specify the entirety of executable syntax, or alternatively, may specify a location from which such executable syntax can be retrieved for invocation. While the latter approach is not illustrated by the examples in column 140, it will be obvious to those of ordinary skill in the art how such location can be specified. A file name or Uniform Resource Locator ("URL") of stored executable code may be specified, for example.

The sample data structure 200 in FIG. 2 (shown as a table, by way of illustration but not of limitation) may be created for an HA environment to specify a tiered, cost-based approach to invoking the proactive measures specified in data structure 100 of FIG. 1. Data structure 200 specifies, for selected likelihoods of an outage-producing natural disaster (referred to equivalently hereinafter simply as a "disaster"), what business cost is deemed to be merited by that likelihood. See columns 210, 220, respectively. The values in FIG. 2 may be considered as thresholds, such that as each threshold is crossed, a different level of HA actions is indicated, as will now be described.

The likelihood of an outage-producing disaster 210 may be specified in rows of data structure 200 at varying degrees of granularity, as deemed appropriate for a particular HA environment. In the example, 3 different likelihood percentages are specified, namely 20 percent, 60 percent, and 90 percent. For each of these likelihood percentages, a business cost merited value 220 is specified, where the values in column 220 will be used by the costing algorithm of a preferred embodiment in correlation with the entries in column 130 of FIG. 1. So, for the example illustrated by FIGS. 1 and 2, if there is only a 20 percent likelihood (row 240) that a predicted disaster will occur, the corresponding "less than or equal to 10" value in column 220 does not match any of the values in column 130. This indicates that the HA environment for which data structures 100, 200 were created chooses not to perform any of the proactive measures specified in data structure 100 under this scenario. However, if the likelihood of disaster rises to 60 percent (row 250), then the corresponding value in column 220 indicates that this HA environment wants to invoke all proactive measures for which the weighted business cost is "less than or equal to 35". Accordingly, in the example, the proactive measures represented in rows 150 and 160 in data structure 100 will be automatically invoked, but those of rows 170 and 180 will not. Finally, if the likelihood of disaster rises to 90 percent (row 260), then the corresponding "less than or equal to 100" value in column 220 indicates that this HA environment wants to invoke all of the proactive measures in rows 150-180 (i.e., all of the weighted business cost entries in column 130 match the "less than or equal to 100 units" threshold).

An embodiment of the present invention receives a predicted likelihood value from a predictive analytic system for natural disaster(s), and an embodiment of the present invention uses a costing algorithm approach whereby this likelihood value selects a row from data structure 200 (according to entries in column 210) and then maps the corresponding value from column 220 (i.e., the business cost merited value) to values in weighted business cost 130 column. In this manner, an embodiment of the present invention determines what proactive measures to automatically invoke by determining which of the rows in data structure 100 correlate to the predicted likelihood value received from the predictive analytic system. Accordingly, the costing algorithm approach can be seen as balancing the business cost of taking a proactive measure with the corresponding business impact.

Embodiments of the present invention provide a proactive or preemptive approach to disaster management, and therefore to disaster recovery, and aim to provide high availability during and/or after the disaster. If the unscheduled backup specified in row 150 is performed, for example, an HA environment will have a backup copy of data from which it can restore its files or other data structures (according to the type of backup performed), and thus the HA environment may be able to provide uninterrupted service to its users instead of having to shut down service while data is recovered and restored. The backup copy can also, or alternatively, be used to facilitate recovery from a disaster, and thus it can be seen that an embodiment of the present invention enables proactively performing measures for disaster recovery as well as for high availability (and accordingly, reference herein to high availability should be construed as also including disaster recovery).

A particular HA environment may choose different proactive measures for different types of natural disaster. Preferably, a separate version of data structure 100 is created for each such different disaster. Typically, a separate version of data structure 200 will be created to correspond to each such different data structure 100, although alternatively, it may be possible to share the information in data structure 200 among multiple versions of data structure 100.

Turning now to the sample data in FIGS. 3 and 4, the sample proactive measures information and likelihood/cost information specified therein will now be described, after which the use of these values by an embodiment of the present invention will be described with reference to the flowchart in FIG. 5.

FIG. 3 illustrates an alternative form of the data structure 100 of FIG. 1. See reference number 300. Again, this sample data structure 300 (shown as a table, by way of illustration but not of limitation) may be created for an HA environment to specify information pertaining to proactive measures that may need to be taken in view of an impending natural disaster. In this alternative form 300, the pertinent information comprises the particular proactive measure (column 310); an executable command or script, or other identifier of executable functionality, to be invoked in an automated manner (column 320); and a weighted business cost of taking that measure (column 330). Columns 310, 320, 330 of the example will now be described.

In this example, the sample proactive measures 310 that are specified in rows 340-370 are generally the same as those specified in column 110 of data structure 100 (although with slightly different terminology), and the sample weighted business cost values in column 330 are the same as those specified in column 130 of data structure 100. In this alternative data structure 300, however, column 120 is now omitted (and its information may be separately stored, if desired). Column 320 now provides sample syntax for locating stored executable scripts, each corresponding to one of the proactive measures in column 310 and providing stored syntax for carrying out the proactive measure in an automated manner.

Note that rows 360, 370 of FIG. 3 use the nomenclature "HA/DR". This is a reminder that an embodiment of the present invention may be used to provide high availability, and/or to facilitate disaster recovery, as was discussed above with reference to performing an unscheduled backup of data.

FIG. 4 illustrates an alternative version of the data structure 200 of FIG. 2. See reference number 400. This sample data structure (shown as a table, by way of illustration but not of limitation) may be created for an HA environment to specify a tiered, cost-based approach to invoking the proactive measures specified in data structure 300 of FIG. 3. Data structure 400 specifies, for selected likelihoods of an outage-producing disaster (column 410), a cost threshold (column 420) for mapping to the weighted business cost values in column 330 of data structure 300. Columns 410, 420 will now be described.

Columns 410, 420 specify generally the same type of information as columns 210, 220 of FIG. 2, but have different sample values. Accordingly, the values in column 410 now provide a different degree of granularity for the likelihood of disaster—that is, different percentage values for the likelihood of a disaster, each of these values corresponding to a different cost threshold 420. In the example, 4 different likelihoods are specified, as shown in rows 430-460. For each of these likelihood percentages, a cost threshold value 420 is specified, where the values in column 420 correlate to the entries in column 330 of FIG. 3. By mapping the values in column 420 to those in column 330, it can be seen that for this sample data, all of the proactive measures specified in rows 340-370 will be automatically invoked provided that the likelihood of disaster is 50 percent (row 450) or higher (to include the 80 percent likelihood specified in row 460). That is, if the likelihood of disaster is at least 50 percent (row 450), then the corresponding "less than or equal to 60" value in column 420 will match all of the weighted business cost values 15, 25, 40, and 55 in column 330 of FIG. 3.

Turning now to the flowchart in FIG. 5, an approach to operation of an embodiment of the present invention will now be described. Reference will be made to how an embodiment of the present invention may use the information specified in data structures 300, 400 (or alternatively, in data structures 100, 200). This process begins by receiving notification (Block 510) from a natural disaster predictive analytics system 500. Analytics system 500 may be generally any natural disaster or weather-based predictive system, such as the Bluemix system from International Business Machines Corporation. An HA environment (or HA management function, equivalently) providing an embodiment of the present invention will typically be a subscriber to such predictive analytics system, and will provide the predictive analytics system with information identifying a geography or location of interest (although an embodiment of the present invention is not limited to a subscription model of interacting with system 500). The predictive analytics system 500 will typically send a notification to the HA environment using an application programming interface ("API") for message exchange. In one approach, an unsolicited API call may be used by system 500 to issue a notification to the HA environment; in another approach, the HA environment may request current information from system 500 using an API call, and the notification from system 500 may be sent as a response thereto. In either approach, the received notification will typically specify at least one parameter, and thus FIG. 5 depicts the sample syntax as "APIx( )". The at least one parameter of the received notification typically includes at least the predicted likelihood of a natural disaster. Optionally, the parameter(s) may also specify the type of natural disaster, such that the receiving embodiment can select appropriate corresponding data structures. For example, if the received notification indicates that a flood is anticipated, the receiving embodiment can select a data structure created to specify proactive measures for dealing with a flood. See Block 520, indicating this obtaining of the appropriate proactive measures for the relevant natural disaster from a data repository 501 (where information in repository 501 is illustrated by examples in data structures 100, 300). As alternatives to specifying a predicted likelihood value and/or a predicted type of disaster as parameters of a received notification, a dedicated API might be used to convey this information, such that the received notification inherently identifies the needed values. For example, a received notification might be formatted as "Flood_20PercentLikely". (And as noted earlier, it may happen that an HA environment shares data structures among multiple disaster types, and thus it is not strictly necessary for the received message to identify the type of predicted disaster.)

Once the proactive measures data structure 300 (or 100) is obtained by Block 520, an embodiment determines the likelihood of the predicted disaster (Block 530), according to the received notification. Block 540 then uses the determined likelihood value as an index to access the likelihood/cost data structure 400 (or 200) for the relevant disaster from a data repository 502 (where information in repository 502 is illustrated by examples in data structures 200, 400). Note that data repository 502 may be the same repository as repository 501. Referring to the sample data structures illustrated herein, if data structure 100 is retrieved at Block 520, then corresponding data structure 200 is retrieved at Block 540. Conversely, if data structure 300 is retrieved at Block 520, then corresponding data structure 400 is retrieved at Block 540.

Block 550 maps the likelihood prediction, according to the notification received at Block 510, to connect the business cost merited, or cost threshold, from the likelihood/cost data structure (illustrated at columns 220, 420) to the appropriate weighted business cost values from the proactive measures data structure (illustrated at columns 130, 330). This provides a tiered costing algorithm approach to selecting which specified proactive measures (if any) to automatically and proactively invoke, in view of the business cost of taking that proactive measure and the corresponding business impact. In a preferred embodiment, this comprises first using the likelihood prediction from the received notification to locate a corresponding row in the likelihood/cost data structure 200 or 400, and then using the cost threshold value from that row as an index to select any rows of the proactive measures data structure 100 or 300 that meet the cost threshold.

Once the rows from the proactive measures data structure are determined by Block 550, Block 560 locates each corresponding executable—i.e., the executable specified in or identified from columns 140, 320 of the located rows. Each such executable is then automatically invoked at Block 570. The processing of FIG. 5 then ends.

Note that there may be times when zero rows are located by Block 550, and thus no actions are carried out by Blocks 560 or 570. This will be the result when using the sample data structures 100, 200 with a predicted likelihood of 20 percent or less, for example, where none of the rows of data structure 100 have values in column 130 that meet the "less than 10" units threshold specified in column 220 for row 240.

As has been demonstrated, embodiments of the present invention provide a proactive or preemptive approach to natural disaster management, and therefore to natural disaster recovery, and aim to provide high availability during and/or after the disaster.

Figure 6:
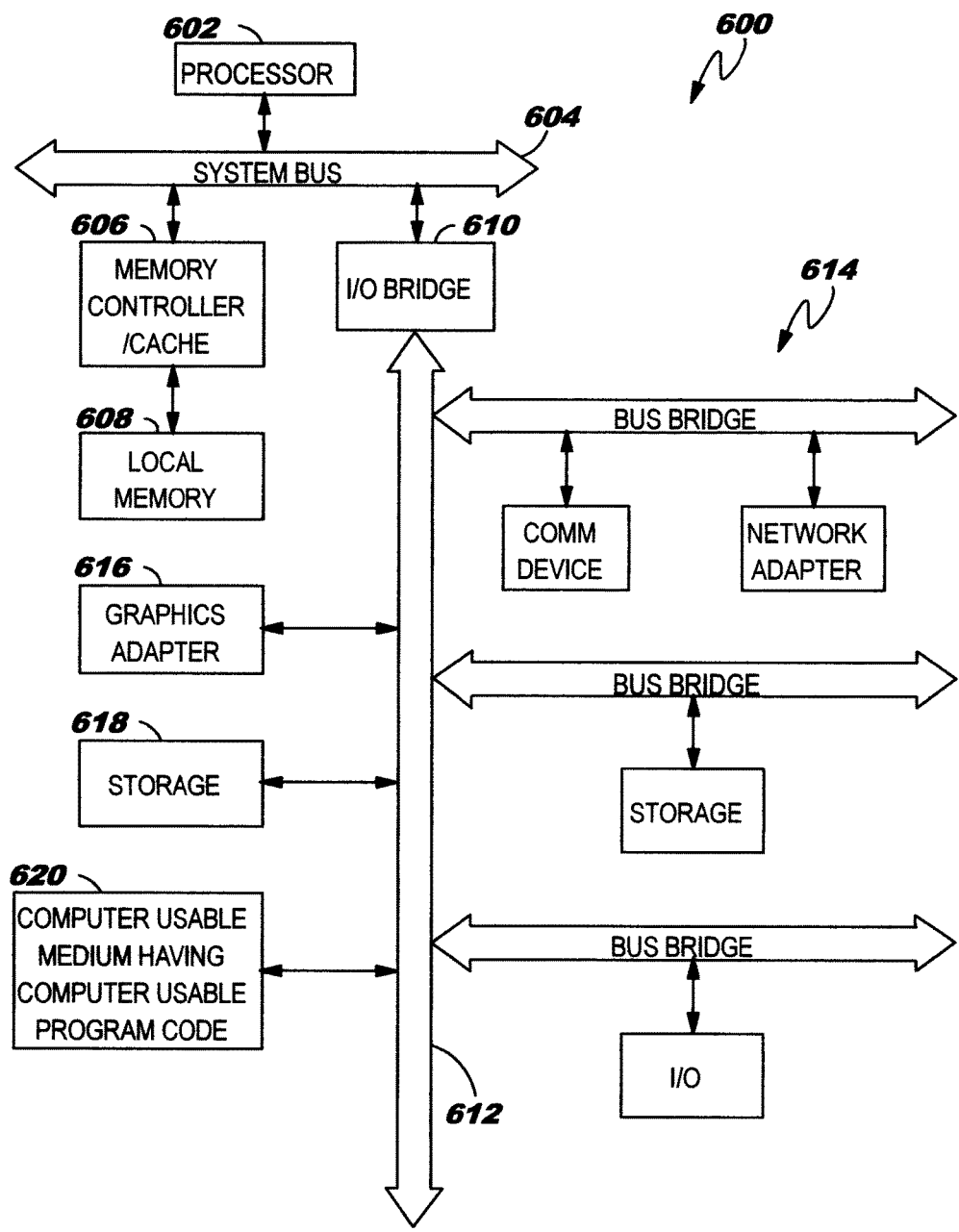
FIG. 6 depicts a block diagram of a data processing system in accordance with an embodiment of the present invention.

Referring now to FIG. 6, a block diagram of a data processing system is depicted in accordance with the present invention. Data processing system 600 may comprise a processor 602 connected to system bus 604. Also connected to system bus 604 is memory controller/cache 606, which provides an interface to local memory 608. An I/O bridge 610 is connected to the system bus 604 and provides an interface to an I/O bus 612. The I/O bus may be utilized to support one or more buses 614 and corresponding devices, such as bus bridges, input output devices ("I/O" devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 616, storage 618, and a computer usable storage medium 620 having computer usable program code embodied thereon. The computer usable program code may be executed to execute any aspect of the present invention, as described herein.

Figure 7:
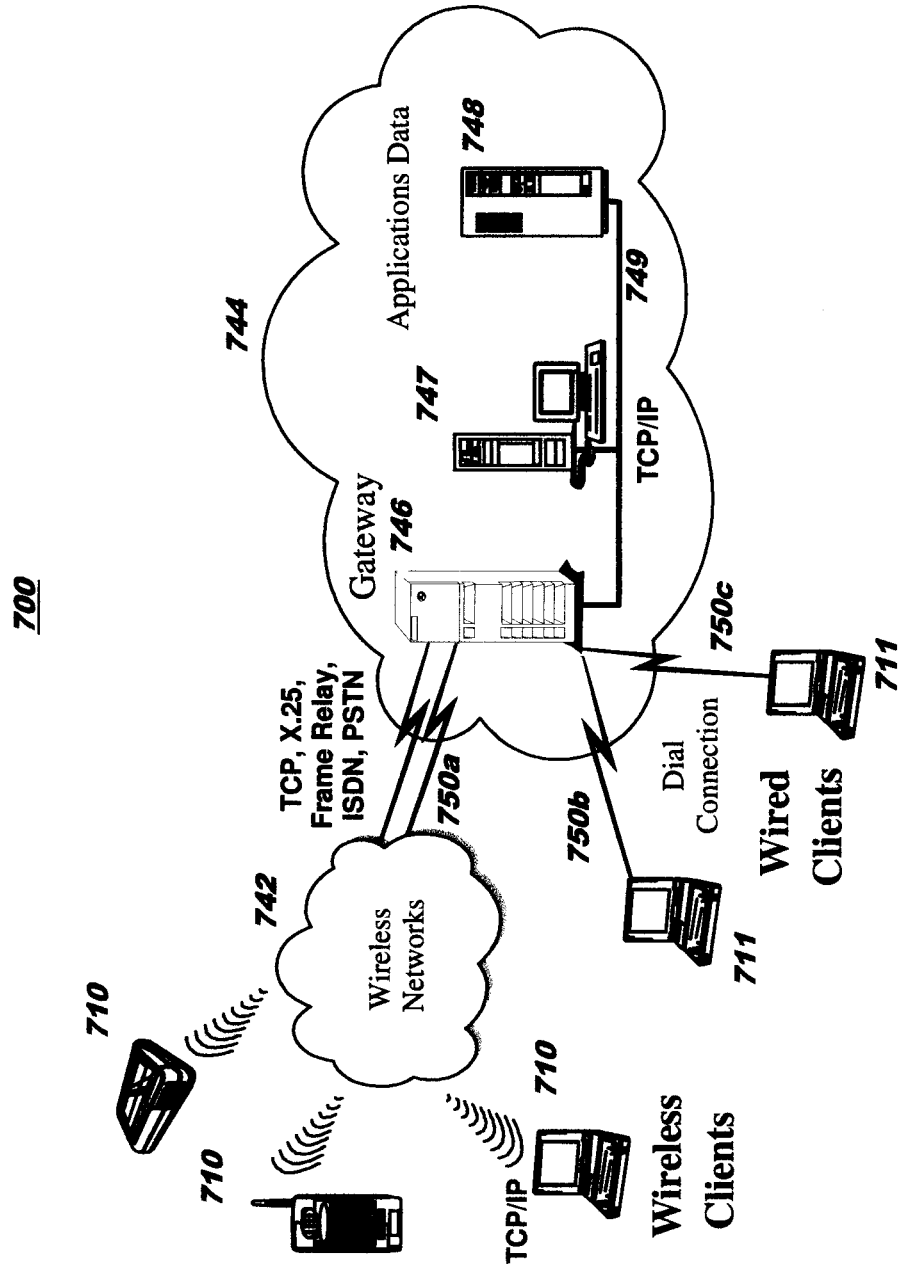
FIG. 7 depicts a representative networking environment in which one or more embodiments of the present invention may be used.

FIG. 7 illustrates a data processing network environment 700 in which the present invention may be practiced. The data processing network 700 may include a plurality of individual networks, such as wireless network 742 and wired network 744. A plurality of wireless devices 710 may communicate over wireless network 742, and a plurality of wired devices, shown in the figure (by way of illustration) as workstations 711, may communicate over network 744. Additionally, as those skilled in the art will appreciate, one or more local area networks ("LANs") may be included (not shown), where a LAN may comprise a plurality of devices coupled to a host processor.

Still referring to FIG. 7, the networks 742 and 744 may also include mainframe computers or servers, such as a gateway computer 746 or application server 747 (which may access a data repository 748). A gateway computer 746 serves as a point of entry into each network, such as network 744. The gateway 746 may be preferably coupled to another network 742 by means of a communications link 750a. The gateway 746 may also be directly coupled to one or more workstations 711 using a communications link 750b, 750c, and/or may be indirectly coupled to such devices. The gateway computer 746 may be implemented utilizing an Enterprise Systems Architecture/390® computer available from IBM. Depending on the application, a midrange computer, such as an iSeries®, System i™, and so forth may be employed. ("Enterprise Systems Architecture/390" and "iSeries" are registered trademarks, and "System i" is a trademark, of IBM in the United States, other countries, or both.)

The gateway computer 746 may also be coupled 749 to a storage device (such as data repository 748).

Those skilled in the art will appreciate that the gateway computer 746 may be located a great geographic distance from the network 742, and similarly, the workstations 711 may be located some distance from the networks 742 and 744, respectively. For example, the network 742 may be located in California, while the gateway 746 may be located in Texas, and one or more of the workstations 711 may be located in Florida. The workstations 711 may connect to the wireless network 742 using a networking protocol such as the Transmission Control Protocol/Internet Protocol ("TCP/IP") over a number of alternative connection media, such as cellular phone, radio frequency networks, satellite networks, etc. The wireless network 742 preferably connects to the gateway 746 using a network connection 750a such as TCP or User Datagram Protocol ("UDP") over IP, X.25, Frame Relay, Integrated Services Digital Network ("ISDN"), Public Switched Telephone Network ("PSTN"), etc. The workstations 711 may connect directly to the gateway 746 using dial connections 750b or 750c. Further, the wireless network 742 and network 744 may connect to one or more other networks (not shown), in an analogous manner to that depicted in FIG. 7.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A method for proactive natural disaster preparedness, comprising:
    receiving, at a computer of a computing environment, a notification of an impending natural disaster;
    determining, by the computer, a threshold corresponding to a likelihood of the predicted disaster, further comprising:
        using the likelihood to index into a data structure that stores, for each of a plurality of likelihood values, a corresponding threshold, wherein:
            each of the stored thresholds represents a different cost tier;
            each successively-higher cost tier corresponds to a successively-higher weighted business cost value; and
            the determined threshold is the stored threshold that corresponds, in the data structure, to a likelihood value that is less than or equal to the likelihood of the predicted disaster;
    determining, by the computer for the threshold, at least one proactive measure corresponding thereto for enabling the computing environment to maintain high availability, further comprising:
        using the threshold to index into a data store that stores, for each of a plurality of successively-higher weighted business cost values, a corresponding proactive measure and executable functionality to invoke the corresponding proactive measure; and
        selecting, as the determined at least one proactive measure, each of the corresponding proactive measures that corresponds, in the data store, to a weighted business cost value that is less than or equal to the threshold; and
    automatically causing the computing environment to carry out the executable functionality to invoke each of the at least one determined proactive measure and thereby maintain the high availability of the computing environment without manual invocation.

2. The method according to claim 1, wherein the likelihood is specified in the received notification.

3. The method according to claim 1, wherein the notification is received from a natural disaster prediction system.

4. The method according to claim 1, wherein each of the stored thresholds represents a business cost merited for a corresponding likelihood.

5. The method according to claim 1, wherein:
    the received notification specifies a type of the predicted disaster and
    the data store that is indexed by the threshold stores a plurality of proactive measures that are specific to the predicted disaster type.

6. The method according to claim 1, wherein the determining the threshold and the determining the at least one proactive measure together comprise executing a costing algorithm that balances a weighted business cost of executing a proactive measure with a corresponding business impact.

7. The method according to claim 1, wherein the proactive measures stored in the data store are selected from the group comprising shifting workload of the computing environment, performing an unscheduled backup of the computing environment, reallocating resources of the computing environment, dynamically requesting licenses on a machine that will take over workload of the computing environment, and de-licensing from a machine that will have its workload migrated elsewhere.

8. A system for proactive natural disaster preparedness, the system comprising:
a computer-readable comprising a processor; and
instructions which are executable, using the processor, to perform functions comprising:
receiving, at a computer of a computing environment, a notification of an impending natural disaster;
determining, by the computer, a threshold corresponding to a likelihood of the predicted disaster, further comprising:
using the likelihood to index into a data structure that stores, for each of a plurality of likelihood values, a corresponding threshold, wherein:
each of the stored thresholds represents a different cost tier;
each successively-higher cost tier corresponds to a successively-higher weighted business cost value; and
the determined threshold is the stored threshold that corresponds, in the data structure, to a likelihood value that is less than or equal to the likelihood of the predicted disaster;
determining, by the computer for the threshold, at least one proactive measure corresponding thereto for enabling the computing environment to maintain high availability, further comprising:
using the threshold to index into a data store that stores, for each of a plurality of successively-higher weighted business cost values, a corresponding proactive measure and executable functionality to invoke the corresponding proactive measure; and
selecting, as the determined at least one proactive measure, each of the corresponding proactive measures that corresponds, in the data store, to a weighted business cost value that is less than or equal to the threshold; and
automatically causing the computing environment to carry out the executable functionality to invoke each of the at least one determined proactive measure and thereby maintain the high availability of the computing environment without manual invocation.

9. The system according to claim 8, wherein:
the received notification specifies the likelihood and a type of the predicted disaster; and
the data store that is indexed by the threshold stores a plurality of proactive measures that are specific to the predicted disaster type.

10. The system according to claim 8, wherein:
the natural disaster comprises a weather-related disaster; and
the notification is received from a weather-related disaster prediction system.

11. The system according to claim 8, wherein each of the stored thresholds represents a business cost merited for a corresponding likelihood.

12. The system according to claim 8, wherein the proactive measures stored in the data store are selected from the group comprising performing unscheduled backup of storage of the computing environment, allocating additional network bandwidth to a replication pipeline with which workload of the computing environment will be transferred elsewhere, licensing additional processors on a machine to which workload of the computing environment will be transferred, activating additional processors on a machine to which workload of the computing environment will be transferred, and beginning migration of production from the computing environment to another machine.

13. A computer program product for proactive natural disaster preparedness, the computer program product comprising:
a computer-readable storage medium having computer readable program code embodied therein, the computer-readable program code configured for:
receiving, at a computer of a computing environment, a notification of an impending natural disaster;
determining, by the computer, a threshold corresponding to a likelihood of the predicted disaster, further comprising:
using the likelihood to index into a data structure that stores, for each of a plurality of likelihood values, a corresponding threshold, wherein:
each of the stored thresholds represents a different cost tier;
each successively-higher cost tier corresponds to a successively-higher weighted business cost value; and
the determined threshold is the stored threshold that corresponds, in the data structure, to a likelihood value that is less than or equal to the likelihood of the predicted disaster;
determining, by the computer for the threshold, at least one proactive measure corresponding thereto for enabling the computing environment to maintain high availability, further comprising:
using the threshold to index into a data store that stores, for each of a plurality of successively-higher weighted business cost values, a corresponding proactive measure and executable functionality to invoke the corresponding proactive measure; and
selecting, as the determined at least one proactive measure, each of the corresponding proactive measures that corresponds, in the data store, to a weighted business cost value that is less than or equal to the threshold; and
automatically causing the computing environment to carry out the executable functionality to invoke each of the at least one determined proactive measure and thereby maintain the high availability of the computing environment without manual invocation.

14. The computer program product according to claim 13, wherein the determining the threshold and the determining the at least one proactive measure together comprise executing a costing algorithm that balances a weighted business cost of executing a proactive measure with a corresponding business impact.

15. The computer program product according to claim 13, wherein:
the received notification specifies a type of the predicted disaster; and
the data store that is indexed by the threshold stores a plurality of proactive measures that are specific to the predicted disaster type.

* * * * *